US006282601B1

United States Patent
Goodman et al.

(10) Patent No.: US 6,282,601 B1
(45) Date of Patent: Aug. 28, 2001

(54) MULTIPROCESSOR DATA PROCESSING SYSTEM AND METHOD OF INTERRUPT HANDLING THAT FACILITATE IDENTIFICATION OF A PROCESSOR REQUESTING A SYSTEM MANAGEMENT INTERRUPT

(75) Inventors: Steven Dale Goodman, Raleigh; Bharat B. Khatri, Cary, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,332

(22) Filed: Mar. 31, 1999

(51) Int. Cl.⁷ ................................................. G06F 13/24
(52) U.S. Cl. ............................................................ 710/260
(58) Field of Search .................................... 710/260, 261, 710/263, 262, 266, 267, 265, 268, 269; 713/300, 310, 320, 323

(56) References Cited

U.S. PATENT DOCUMENTS

| | | | |
|---|---|---|---|
| 4,769,768 | * 9/1988 | Bomba et al. | 710/268 |
| 5,481,724 | * 1/1996 | Heimsoth et al. | 709/229 |
| 5,603,038 | * 2/1997 | Crump et al. | 713/310 |
| 6,145,048 | * 11/2000 | Klein | 710/264 |
| 6,192,442 | * 2/2001 | Haren et al. | 710/269 |
| 6,205,509 | * 3/2001 | Platko et al. | 710/260 |

* cited by examiner

Primary Examiner—Robert Beausoleil
Assistant Examiner—X. Chung-Trans
(74) Attorney, Agent, or Firm—Bracewell & Patterson, LLP

(57) ABSTRACT

Within a multiprocessor data processing system, a request for a system management interrupt by a requesting processor causes the state of at least the requesting processor to be saved in memory. Each processor's saved state includes contents of at least one internal software-writable register, where the software-writable register of the requesting processor contains an identifying signature. A system management interrupt handler is then executed. Execution of the system management interrupt handler entails determining, from the contents of at least one internal software-writable register saved within memory, the identity of the requesting processor. The system management interrupt handler then handles the system management interrupt in accordance with the determination of the requesting processor. The handling of the system management interrupt may entail reading data from or writing data into the saved state of the requesting processor.

15 Claims, 4 Drawing Sheets

MULTIPROCESSOR DATA PROCESSING SYSTEM AND METHOD OF INTERRUPT HANDLING THAT FACILITATE IDENTIFICATION OF A PROCESSOR REQUESTING A SYSTEM MANAGEMENT INTERRUPT

BACKGROUND OF THE INVENTION

1. Technical Field

The present invention relates in general to data processing and in particular to interrupt handling within a multiprocessor data processing system. Still more particularly, the present invention relates to a multiprocessor data processing system and method of interrupt handling that facilitate identification of a processor requesting a System Management Interrupt (SMI).

2. Description of the Related Art

In a conventional computer system, the occurrence of certain events causes a hardware component of the computer system to assert an interrupt signal. The assertion of an interrupt signal triggers some response by the computer system, typically the execution of an interrupt handler that calls an appropriate interrupt vector for the event. Events whose occurrence may trigger an interrupt generally include the receipt of peripheral input (e.g., from a mouse or keyboard), a power management timer indicating that a user input has not been received in a threshold amount of time, the execution of a software interrupt command, etc.

The differences in the types of events triggering assertion of the interrupt signals and the differing importance of the events has led to the classification of interrupts into various categories. For example, the receipt of peripheral inputs typically triggers "normal" interrupts having various assigned priorities. The highest priority events, such as a severe memory error or detection of impending power failure, trigger non-maskable interrupts (NMIs), so called because a processor cannot defer handling of the interrupt by masking (i.e., blocking) interrupts of that priority. Another classification of interrupts is System Management Interrupts (SMIs), which denote interrupts, such as those generated by Advanced Power Management (APM) controllers, that affect the maintenance, configuration, and operation of the computer system itself rather than merely software executed by the computer system.

In a conventional multiprocessor computer system, an SMI generated by a processor is received by an interrupt controller or other interrupt handling hardware, which routes the SMI to a designated processor for handling. In response to assertion of its SMI line, the handling processor suspends execution of its current thread and executes an SMI handler that services the SMI. Typically, some or all of the other processors will similarly suspend execution in response to the SMI and save the states of their respective threads. The SMI handler then examines the instruction sequence within the saved state of each processor in turn to determine which processor issued the SMI request. In order to expedite identification of the requesting processor, conventional SMI handlers typically examine only the last instruction executed by each processor in order to locate an SMI-generating instruction. Thus, in order to accommodate this SMI handler behavior, the hardware design of the interrupt hardware must ensure that the SMI is generated and recognized by each processor before each processor executes the next instruction within its respective thread.

The present invention recognizes that this condition is more difficult to satisfy as processor clock rates increase. The present invention therefore provides an improved multiprocessor data processing system and method for handling interrupts in which the identification of the processor requesting an SMI is can be readily determined without having to satisfy such severe interrupt timing constraints.

SUMMARY OF THE INVENTION

In accordance with the present invention, a request for a system management interrupt by a requesting processor within a multiprocessor data processing system causes the state of at least the requesting processor to be saved in memory. Each processor's saved state includes contents of at least one internal software-writable register, where the software-writable register of the requesting processor contains an identifying signature. A system management interrupt handler is then executed. Execution of the system management interrupt handler entails determining, from the contents of at least one internal software-writable register saved within memory, the identity of the requesting processor. The system management interrupt handler then handles the system management interrupt in accordance with the determination of the requesting processor. The handling of the system management interrupt may entail reading data from or writing data into the saved state of the requesting processor.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
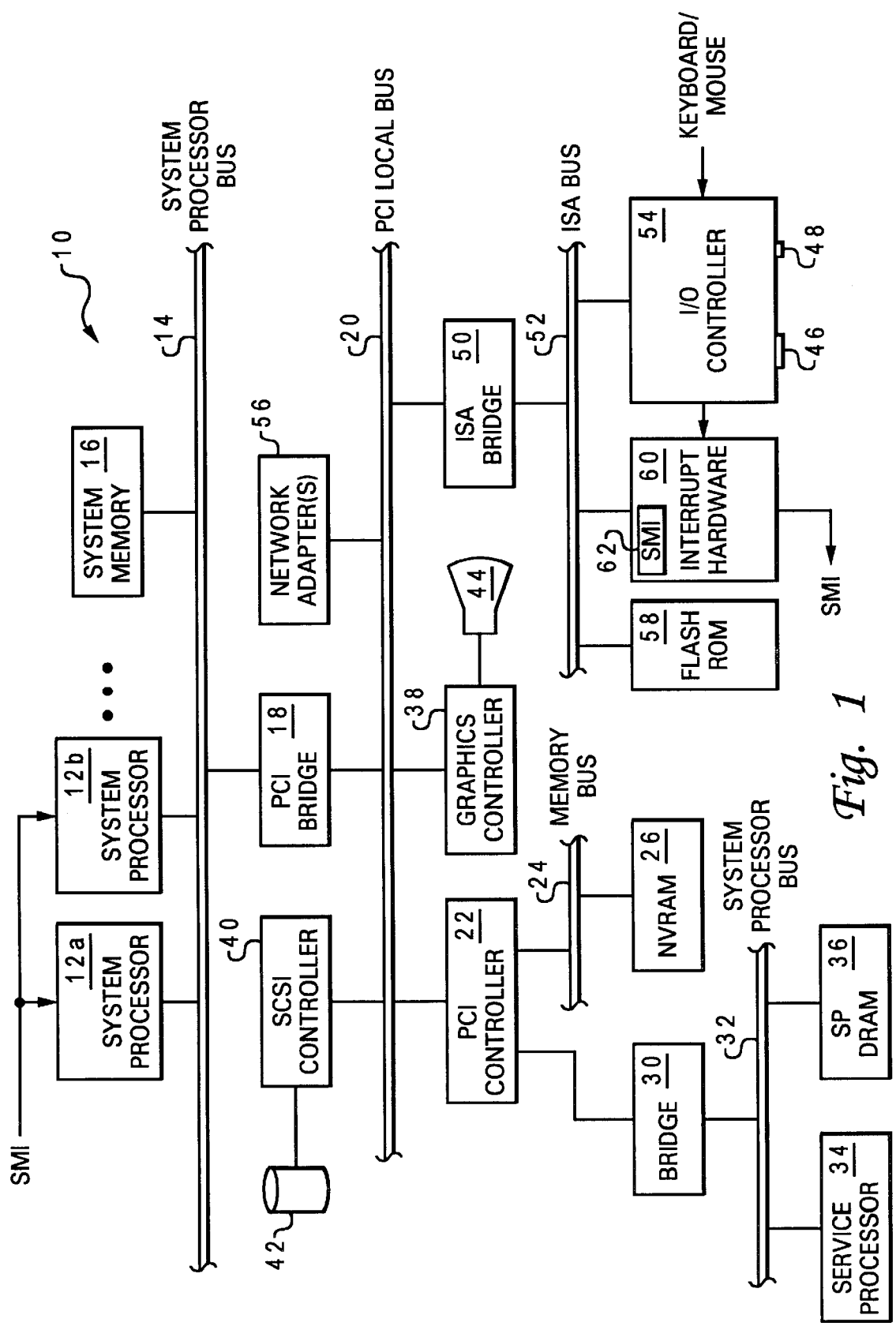
FIG. 1 depicts an illustrative embodiment of a multiprocessor data processing system with which the present invention may advantageously be utilized.

With reference now to the figures and in particular with reference to FIG. 1, there is depicted a high level block diagram of an illustrative embodiment of a multiprocessor data processing system 10 with which the present invention may advantageously be utilized. The illustrative embodiment depicted in FIG. 1 can be realized as a workstation computer system or as a server computer system, such as the Netfinity™, manufactured by International Business Machines (IBM) Corporation of Armonk, N.Y.; however, as will become apparent from the following description, the present invention is also applicable to any other multiprocessor data processing system supporting System Management Interrupts (SMIs).

As illustrated in FIG. 1, multiprocessor data processing system 10 includes at least two system processors 12a and 12b, which are each coupled to system processor bus 14. Each system processor 12 is a general-purpose processor (e.g., an Intel Pentium II or Pentium III) that typically processes data under the control of operating system and application software stored in system memory 16. System processors 12 are coupled via system processor bus 14 and Peripheral Component Interconnect (PCI) bridge 18 to PCI local bus 20.

PCI local bus 20 interconnects a number of devices for communication under the control of PCI controller 22. These devices include a Small Computer System Interface (SCSI) controller 40, which provides an interface to SCSI hard disk 42, graphics controller 38, which provides an interface for a display 44, and network adapter(s) 56, which interface data processing system 10 to a data communication network (not illustrated). In addition to controlling communication on PCI local bus 20, PCI controller 22 also provides an attachment point for additional buses, such as memory bus 24 and service processor bus 32. As illustrated, a Non-Volatile Random Access Memory (NVRAM) 26 storing configuration parameters and other important data is connected to memory bus 24. Service processor bus 32, which is coupled to PCI controller 22 through a bridge 30, supports a service processor 34, which serves as a hardware and software system monitor. The functionality of service processor 34 is governed by system monitoring software stored in Service Processor Dynamic Random Access Memory (SP DRAM) 36.

PCI local bus 20 is further coupled to an Industry Standard Architecture (ISA) bus 52 by an ISA bridge 50. As shown, ISA bus 52 has an attached I/O (Input/Output) controller 54 that interfaces data processing system 10 to peripheral input devices such as a keyboard and mouse (not illustrated) and supports external communication via parallel and serial ports 46 and 48, respectively. ISA bus 52 is also coupled to flash Read Only Memory (ROM) 58, which stores boot code executed by a designated boot processor (e.g., system processor 12a) among system processors 12 to initialize data processing system 10 at system startup.

Interrupts generated within data processing system 10, including I/O interrupts, interprocessor interrupts (IPs), and SMIs, are all collected and routed to system processors 12 for handling by interrupt hardware 60, which is also attached to ISA bus 52. Interrupt hardware 60, which in a typical embodiment is implemented with an interrupt chipset including an interrupt controller and supporting chips, can be implemented by any conventional interrupt architecture such as Intel's APIC architecture or the OpenPIC (Open Processor Interrupt Controller) architecture developed by Advanced Micro Devices, Inc. and Cyrix, Inc. As shown, interrupt hardware 60 includes an SMI request register 62 that, when written by a bus operation on ISA bus 52, causes interrupt hardware 60 to signal an SMI to all of system processors 12.

Figure 2:
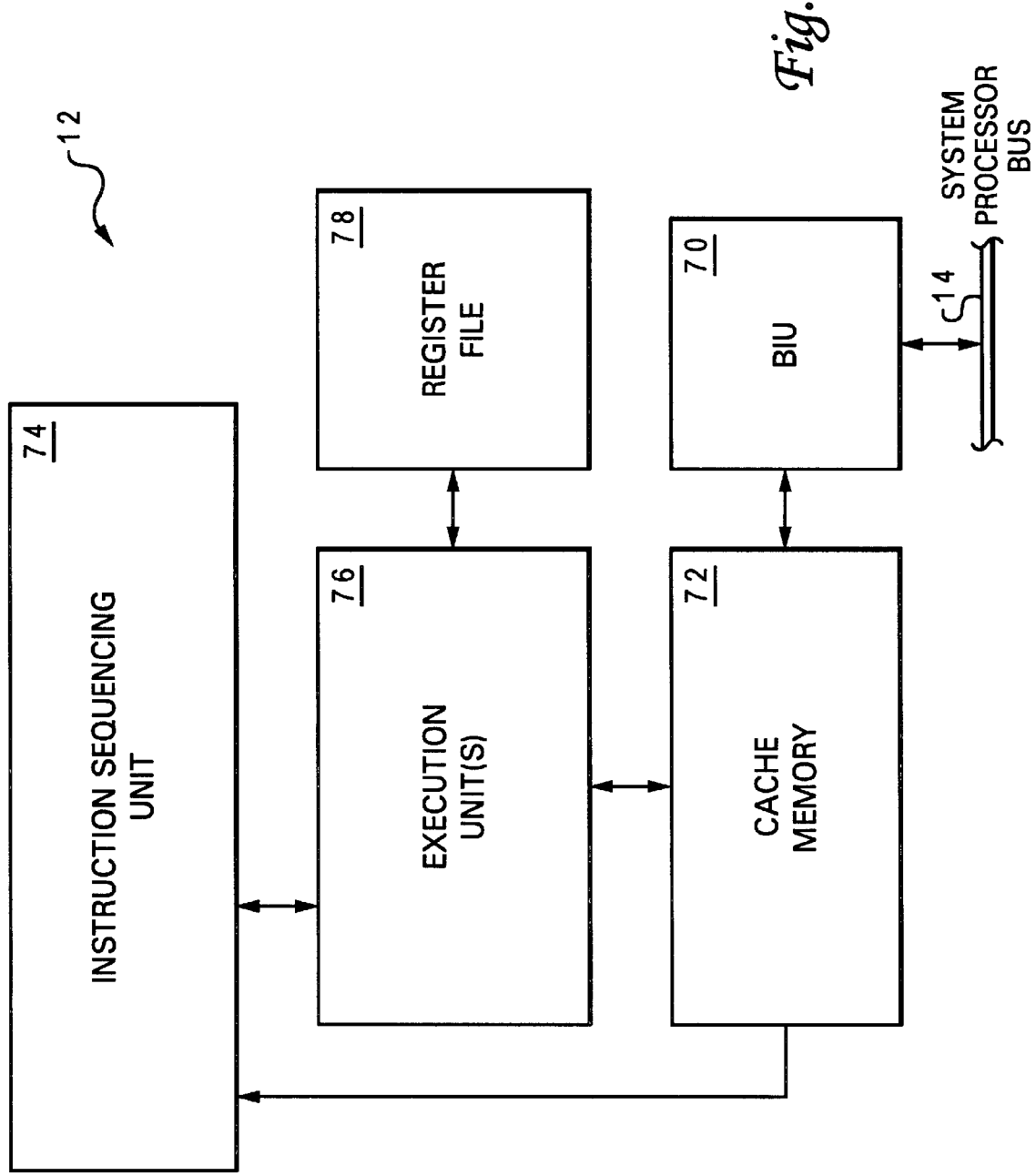
FIG. 2 is a more detailed block diagram of a system processor of the multiprocessor data processing system shown in FIG. 1.

Referring now to FIG. 2, there is depicted a high level block diagram of an illustrative embodiment of a system processor 12 within data processing system 10 of FIG. 1. As illustrated, system processor 12 is coupled to system processor bus 14 via a bus interface unit (BIU) 70. BIU 70 controls the transfer of information between system processor 12 and other devices coupled to system processor bus 14. BIU 70 is also connected to cache memory 72, which provides low latency storage for a subset of data and instructions previously transferred from system memory 16. Cache memory 72 is further connected to instruction sequencing unit 74, which fetches instructions from cache memory 72 during each cycle.

Branch-type instructions fetched from cache memory 72 are processed internally by instruction sequencing unit 74; sequential instructions, on the other hand, are dispatched by instruction sequencing unit 74 to execution unit(s) 76 for execution. Operands required for instruction execution as well as data resulting from instruction execution may be stored within register file 78. Thus, registers within register file 78 are both read-accessible and write-accessible by software. Register file 78 preferably contains a plurality of registers for storing operands and result data, and these registers may be grouped into multiple separately addressable subsets based upon the types of operand and result data they store. As discussed further below, one of the registers (e.g., register 0) within register file 78 is preferably designated by Power-On Self-Test (POST) code executed at power-on as an SMI signature register.

Figure 3:
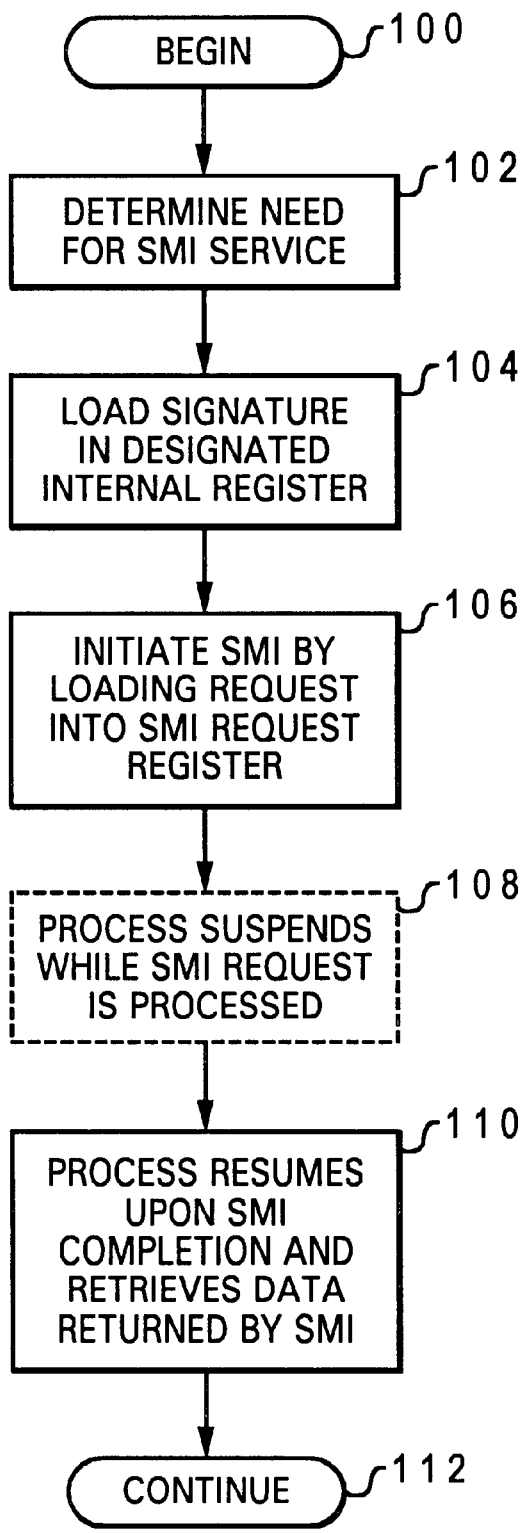
FIG. 3 is a high level logical flowchart of a preferred embodiment of a method by which a system processor in a multiprocessor data processing system requests a system management interrupt.

With reference now to FIG. 3, there is illustrated a high level logical flowchart of a preferred embodiment of a method by which a system processor 12 in multiprocessor data processing system 10 requests an SMI. As shown, the process begins at block 100 when a system processor 12, such as system processor 12b, is executing a process. During execution, the process may determine that SMI service should be requested, as shown at block 102. In general, the process will make a determination that SMI service should be requested if the process desires to modify system configuration or system operation, for example, by powering down multiprocessor data processing system 10. In response to this determination, processor 12b executes an instruction in the process that stores an SMI signature into a designated register (e.g., register 0) within register file 78, as illustrated at block 104. The SMI signature that is utilized is arbitrary, but serves during SMI handling to indicate that processor 12b requested an SMI, as discussed further below. As depicted at block 106, processor 12b then executes an I/O instruction within the process that causes BIU 70 to source a write operation on system processor bus 14 targeting memory-mapped SMI request register 62. This bus write operation is routed through PCI bridge 18 and ISA bridge 50 onto ISA bus 52. In response to snooping the address portion of the bus write operation, interrupt hardware 60 captures the data portion of the bus write operation (i.e., the SMI request) and stores it into SMI request register 62. Again, the particular data required to trigger an SMI is dependent upon the implementation of interrupt hardware 60, but the SMI request preferably is utilized to convey the type of SMI service desired by requesting processor 12. The size of the data portion of the bus write operation and/or SMI request register 62 in current systems is frequently insufficient to permit the identification of both the requested SMI service and the requesting processor.

Interrupt hardware 60 responds to an SMI request being written into SMI request register 62 by asserting an SMI interrupt to all of processors 12. Although each of processors 12 accepts the SMI, only the boot processor (e.g., system processor 12a) executes an SMI handler to service the SMI, as described in greater detail below with respect to FIG. 4. Meanwhile, as shown at block 108, the requesting processor (i.e., system processor 12b) suspends execution of its process and stores the state of the process, including the contents of register file 78 and other volatile data of system processor 12b, to memory (e.g., system memory 16). Depending upon implementation, some or all of the other system processors 12 will similarly save the states of their processes and suspend execution. Thus, at a minimum, the boot processor and the requesting processor (which may be the same processor) will save the states of their processes to memory.

As illustrated at block 110, at the conclusion of the SMI handler each processor 12 that suspended execution in response to the SMI reloads the state of its process from memory and resumes execution. Importantly, any data to be passed from the SMI handler to the requesting process is directly written into the state of the requesting process by the SMI handler. Thus, reloading the state of the requesting process into the requesting processor automatically loads into the processor's register file 78 any parameters to be passed from the SMI handler to the requesting process. Processing then continues at block 112.

Figure 4:
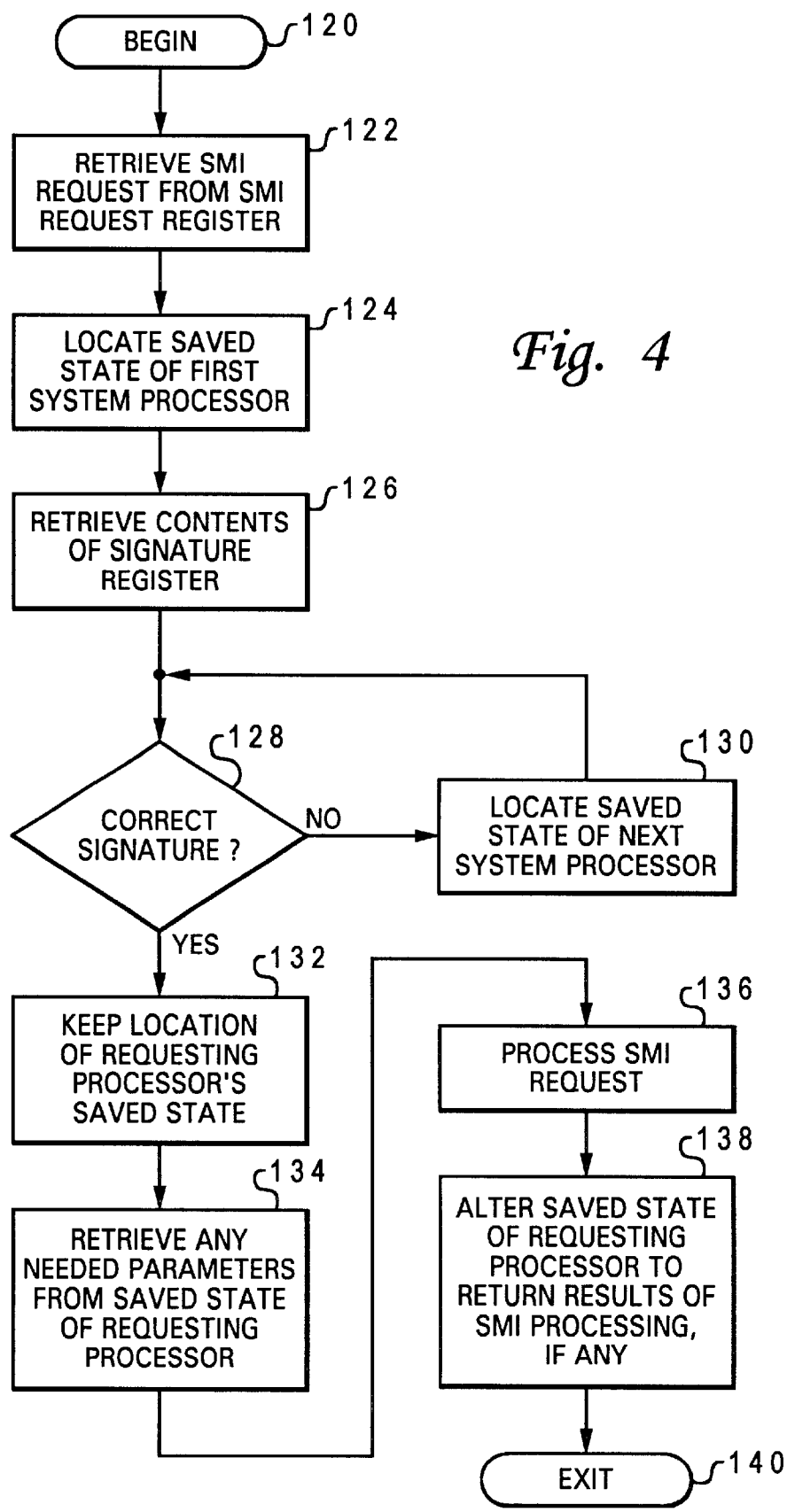
FIG. 4 is a high level logical flowchart of a preferred embodiment of a method of handling a system management interrupt.

Referring now to FIG. 4, there is depicted a high level logical flowchart of a preferred embodiment of an SMI interrupt handler in accordance with the present invention. As illustrated, the SMI handler begins at block 120 in response to receipt at the designated handling processor (e.g., boot processor 12a) of the SMI signal asserted by interrupt hardware 60. Boot processor 12a saves the state of its current process to memory and begins execution of an SMI handler/vector located at an address in memory determined at boot time by POST and/or BIOS. The process then proceeds to block 122, which depicts processor 12a retrieving the SMI request from SMI request register 62 in order to determine what type of SMI service has been requested. Next, as shown at blocks 124 and 126, the SMI handler locates the saved state of a first system processor 12, for example, by reference to a memory map established by POST and/or BIOS, and retrieves from the saved state the contents of the designated signature register. A determination is then made at block 128 whether or not signature register contents reflect the predetermined SMI signature. If not, each additional saved processor state is searched until the requesting processor 12 is found, as illustrated by the process passing to block 130 and returning to block 128.

Once the requesting processor 12 is identified at block 128 by a match between the contents of the signature register and the predetermined SMI signature, the process proceeds to block 132 and following blocks. Block 132 depicts the SMI handler temporarily buffering the base memory address of the requesting processor's saved state. The SMI handler then retrieves from register contents within the saved state of the requesting processor 12 any parameters required to provide the requested SMI service, as shown at block 134. Once these parameters are obtained, the SMI handler proceeds to process the SMI request and provide the service requested by the SMI request, as illustrated at block 136. This SMI service may entail any number of operations, as will be appreciated by those skilled in the art. Any parameters to be passed back to the requesting process (or any of the other suspended processes) are written by the SMI handler directly into the register contents of the saved state of the appropriate process, as illustrated at block 138. This step demonstrates the importance of correctly identifying the requesting processor since communicating results of the interrupt handler alters the saved state of a process. The SMI handler then completes execution with a resume instruction at block 140 that causes boot processor 12a to perform a context switch and restore its saved state from memory.

As has been described, the present invention provides an improved multiprocessor data processing system and method of interrupt handling. According to the present invention, the identity of the processor requesting an SMI is indicated by an SMI signature written into a software-writable signature register of the requesting processor. In this manner, the SMI handler can easily determine the identity of the requesting processor simply by examining the contents of the signature registers within saved processor states. Advantageously, the manner by which the SMI handler identifies the requesting processor eliminates the strict timing requirements between receipt of the SMI request and halting processor execution present in conventional multiprocessor data processing systems.

While the invention has been particularly shown and described with reference to an illustrative embodiment, it will be understood by those skilled in the art that various changes in form and detail may be made therein without departing from the spirit and scope of the invention. Although aspects of the present invention have been described with respect to a computer system executing software that directs the method of the present invention, it should be understood that present invention may alternatively be implemented as a program product for use with a computer system. Programs defining the functions of the present invention can be delivered to a computer system via a variety of signal-bearing media, which include, without limitation, non-writable storage media (e.g., CD-ROM), writable storage media (e.g., a floppy diskette or hard disk drive), and communication media, such as computer and telephone networks. It should be understood, therefore, that such signal-bearing media, when carrying or encoding computer readable instructions that direct the functions of the present invention, represent alternative embodiments of the present invention.

What is claimed is:

1. A method of handling system management interrupts in a multiprocessor data processing system, said method comprising:

writing a signature into an internal software-writable register of a requesting processor among a plurality of processors within the multiprocessor data processing system and requesting a system management interrupt;

in response to said request for a system management interrupt, saving in memory a state of at least said requesting processor, wherein each saved state includes contents of at least one internal software-writable register; and executing a system management interrupt handler, wherein executing said system management interrupt handler includes:

checking contents of at least one internal software-writable register within saved states in memory to determine an identity of said requesting processor; and handling said system management interrupt in accordance with said determination.

2. The method of claim 1, wherein each of said plurality of processors contains a plurality of software-writable registers including a signature register, wherein said checking step comprises checking, of the contents of all of said plurality of software-writable registers within each saved state, only contents of said signature register.

3. The method of claim 1, wherein handling said system management interrupt comprises communicating data between said system management interrupt handler and said saved state of said requesting processor.

4. The method of claim 3, wherein communicating data between said system management interrupt handler and said saved state of said requesting processor comprises reading data from said saved state of said requesting processor.

5. The method of claim 3, wherein communicating data between said system management interrupt handler and said saved state of said requesting processor comprises writing data into said saved state of said requesting processor such that said saved state of said requesting processor is altered.

6. The method of claim 5, and further comprising thereafter resuming processing by said requesting processor from said altered saved state.

7. A multiprocessor data processing system, comprising:
   memory;
   a plurality of processors coupled to said memory, wherein said plurality of processors includes a requesting processor that, to obtain system service, writes a signature into an internal software-writable register and requests a system management interrupt;
   interrupt hardware that, in response to said request, causes at least said requesting processor to save its state in memory, wherein each saved state includes contents of at least one internal software-writable register; and
   a system management interrupt handler, within said memory, executed in response to said request by a processor among said plurality of processors, wherein said system management interrupt handler checks contents of at least one internal software-writable register within saved states in memory to determine an identity of said requesting processor and thereafter handling said system management interrupt in accordance with said determination.

8. The multiprocessor data processing system of claim 7, wherein:
   each of said plurality of processors contains a plurality of software-writable registers including a signature register; and
   said system management interrupt handler checks, of the contents of all of said plurality of software-writable registers within each saved state, only contents of said signature register.

9. The multiprocessor data processing system of claim 7, wherein said system management interrupt handler reads data from said saved state of said requesting processor.

10. The multiprocessor data processing system of claim 7, wherein said system management interrupt handler writes data into said saved state of said requesting processor such that said saved state of said requesting processor is altered.

11. The multiprocessor data processing system of claim 10, wherein said requesting processor, following execution of said system management interrupt handler, resumes processing from said altered saved state.

12. A program product for system management interrupt handling within a multiprocessor data processing system including a memory and a plurality of processors, said program product comprising:
   a data processing system usable medium; and
   a system management interrupt handler within said data processing system usable medium, wherein in response to a request for system management services by a requesting processor among the plurality of processors, said system management interrupt handler identifies the requesting processor by checking contents of an internal software-writable register within at least one saved state of a processor in memory for an interrupt signature and thereafter handles said system management interrupt in accordance with said identification.

13. The program product of claim 12, wherein each of said plurality of processors contains a plurality of software-writable registers including a signature register, said system management interrupt handler checking, of the contents of all of said plurality of software-writable registers within each saved state, only contents of said signature register.

14. The program product of claim 12, wherein said system management interrupt handler reads data from said saved state of said requesting processor.

15. The program product of claim 12, wherein said system management interrupt handler writes data into said saved state of said requesting processor such that said saved state of said requesting processor is altered.

* * * * *